Sept. 10, 1935.  M. E. McRAE  2,014,003
FERTILIZING IMPLEMENT
Filed Dec. 15, 1933
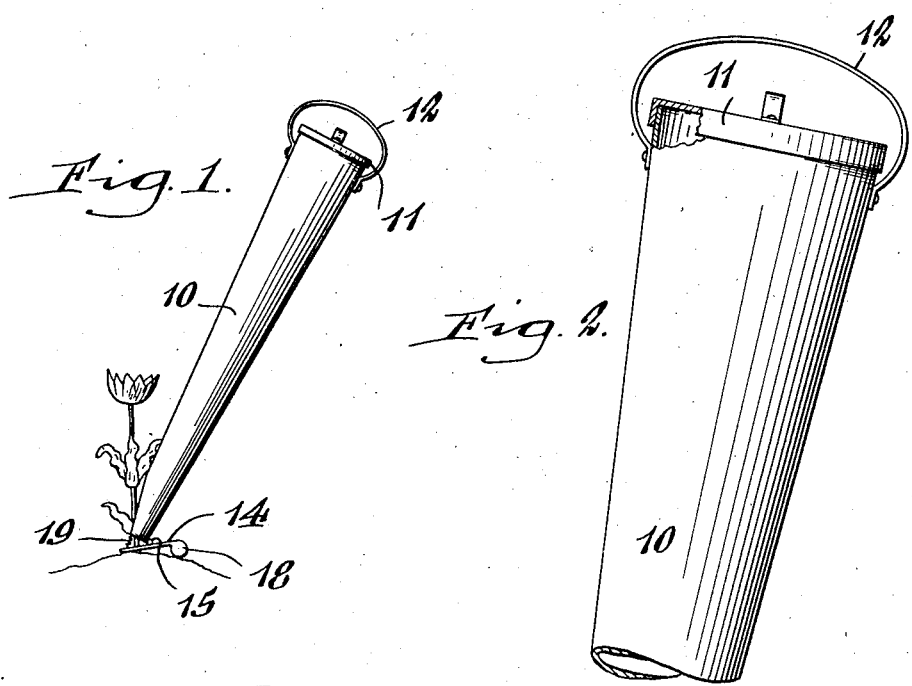
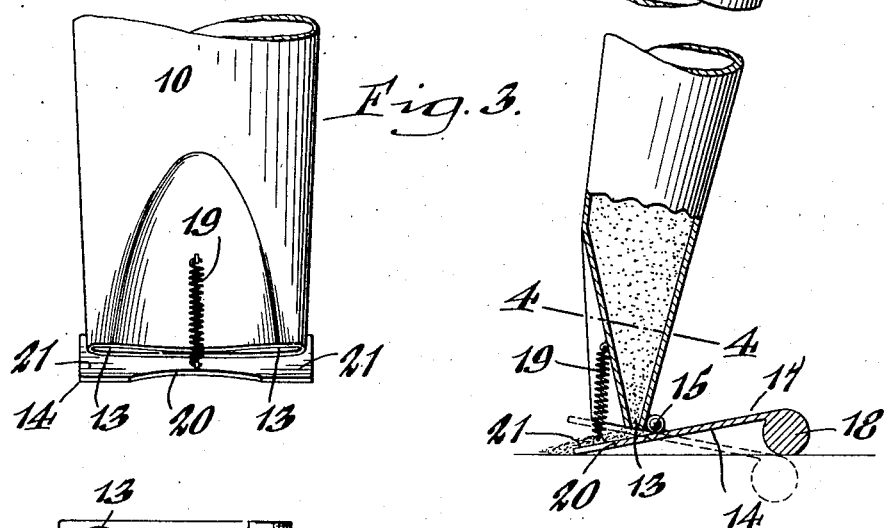
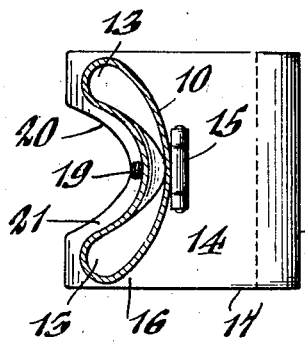
Inventor,
Mary E. McRae,
by Walter P. Guyer
Attorney.

Patented Sept. 10, 1935

2,014,003

UNITED STATES PATENT OFFICE 2,014,003

FERTILIZING IMPLEMENT

Mary E. McRae, North Tonawanda, N. Y.

Application December 15, 1933, Serial No. 702,555

6 Claims. (Cl. 275—11)

This invention relates to certain new and useful improvements in a hand-operated fertilizing device or implement.

One of its objects is the provision of a simple and inexpensive implement of this character which has been so designed and constructed as to facilitate the distribution of the fertilizer where desired in a minimum period of time and without waste.

Another object of the invention is to provide a hand-operated fertilizing implement having efficient automatic means for controlling the discharge of fertilizer as and when desired.

In the accompanying drawing:—

Figure 1 is a side elevation of my fertilizing implement showing the same in an operative position. Figure 2 is an enlarged sectional elevation thereof in a like position. Figure 3 is a fragmentary front face view of the implement. Figure 4 is a horizontal section taken in the plane of line 4—4, Figure 2.

Similar characters of reference indicate corresponding parts throughout the several views.

Referring now to the drawing, the numeral 10 indicates a container or receptacle which is substantially tubular in form for receiving a supply of fertilizer, the upper end of this container being provided with a suitable cover 11. This container is adapted to be manipulated in a suspended or vertical position and for this purpose is provided at its upper end with a handle 12. As shown in Figures 3 and 4, the lower or discharge end of the container is shaped substantially in the form of a U, whereby the same can be brought in proximity to a plant or shrub to fertilize the ground about the same, the lower end of the container terminating in a discharge port or opening 13. It will be noted in Figure 3 that the lower inwardly-dished front wall of the container slopes toward the axis of the container and contacts at its lower edge with the medial portion of its rear wall so that the discharge opening is in fact divided into two portions. By this notching effect at the discharge end of the container, the latter, as seen in Figure 1, may be brought and placed partly around the stem of the shrub.

Applied to the lower side of the container 10 is a vertically-swinging member 14 which is hinged at 15 intermediate its ends to the lower rear side of the container and whose front portion 16 constitutes a control valve for the discharge opening 13, while its rear portion 17 constitutes a trip element for swinging said member to a position to open the valve portion 16, the tripping action being produced by contacting the rear end of the trip element with the ground and resulting in the automatic opening of the control valve to permit the discharge of the fertilizer. For the purpose of normally maintaining the control valve 16 in its closed position and thereby preventing leakage of fertilizer from the container, I preferably provide the trip portion of the member 14 with a weighted end 18. If desired, however, a spring 19 may also be provided to accomplish the same ends. The front edge of the valve portion 16 is notched, as indicated at 20, to fit about the shrub-stem, this notch being of smaller contour than that of the lower end of the container so as to provide a safety guard rim 21 for preventing the placement of the implement too close to the shrub and the fertilizer from contacting with the latter.

In the use of the implement, the user suspends the same from one hand and when a discharge of fertilizer is desired at a given point, the hinge member 14 is automatically tripped by contacting its tripping element 17 with the ground, with the result that the valve portion 16 is opened and the fertilizer allowed to flow by gravity through the divided discharge opening 13 onto the ground. When a sufficient amount of the fertilizer has been discharged, the user merely lifts the container clear of the ground and the hinged member is automatically closed.

I claim as my invention:—

1. An implement of the character described, comprising a container having a discharge opening at its lower end, a normally closed closure for said opening disposed transversely of the container and means applied to said closure below the plane of the container opening for automatically opening said closure upon contacting it with the ground.

2. An implement of the character described, comprising a container having a discharge opening at its lower end, a normally closed closure for said opening hinged to said container and extending transversely thereof over the opening-mouth, and a ground-engaging trip element applied to said closure for opening it, said trip element being disposed below the opening mouth.

3. An implement of the character described, comprising a container having a discharge opening at its lower end, and a member hinged intermediate its ends to said container and having at one side of its axis a portion constituting a control valve for said container-opening and a ground-engaging portion at the other side of its axis and below the plane of the container-opening for governing the actuation of said member to open and close its valve portion.

4. An implement of the character described, comprising a container having a discharge opening at its lower end, a member disposed crosswise of and hinged intermediate its ends to said container adjoining its discharge opening and having at one side of its axis a portion constituting a control valve for said container-opening and a ground-engaging portion at the other side of its axis and below the plane of the container opening and constituting a trip element for swinging said member to a position to open its valve portion, and means for normally urging said member to a position to maintain its valve portion closed.

5. An implement of the character described, comprising a container having a discharge opening at its lower end, and a member hinged to said container immediately adjoining one side of its opening and having a valve portion extending beneath said opening and a weighted portion at the opposite side of the hinge axis and below the plane of the opening for normally holding said valve portion closed and also constituting a ground-engaging trip element for opening the valve portion.

6. An implement of the character described, comprising a container terminating at its lower end in an inwardly dished portion having a discharge opening, and a normally closed valve member for said discharge hinged to said container and having a notch therein substantially concentric with the dished portion of the container.

MARY E. McRAE.